United States Patent
Shih et al.

[19]

[11] Patent Number: 6,109,920
[45] Date of Patent: Aug. 29, 2000

[54] APPARATUS FOR CONNECTING AN AVIONICS CONTROL PANEL AND A TRAINING AND SIMULATION SYSTEM

[75] Inventors: Michael Tsu Yu Shih, Taipei; Jui-lung Liu, Taipei Hsien; Wen-Shu Huang, Taipei, all of Taiwan

[73] Assignee: Institute for Information Industry, Taipei, Taiwan

[21] Appl. No.: 09/041,952

[22] Filed: Mar. 13, 1998

[30]    Foreign Application Priority Data

Mar. 15, 1998 [TW]   Taiwan .................................. 86203993

[51] Int. Cl.[7] ...................................................... G09B 9/08
[52] U.S. Cl. ............................................... 434/37; 434/29
[58] Field of Search .................................. 434/29, 30, 44, 434/69, 118; 703/13, 24; 710/1; 717/10; 701/1

[56]    References Cited

U.S. PATENT DOCUMENTS

| | | | |
|---|---|---|---|
| 4,710,128 | 12/1987 | Wachsmuth et al. | 434/30 X |
| 5,017,141 | 5/1991 | Relf et al. | 434/29 |
| 5,240,419 | 8/1993 | DeGyarfas | 434/118 X |
| 5,533,181 | 7/1996 | Bergsneider | 434/43 |
| 5,827,065 | 10/1998 | McClintic | 434/29 |

*Primary Examiner*—Joe H. Cheng
*Attorney, Agent, or Firm*—Finnegan, Henderson, Farabow, Garrett & Dunner, L.L.P.

[57]    ABSTRACT

A device to connect a control panel of an avionics equipment with a training and simulation apparatus to process and display signals that correspond to output signals of the control panel. The device includes means coupled to a keyboard of the control panel for decoding signals from the control panel keyboard and means coupled to the means for decoding the keyboard signals to convert the keyboard signals into computer keyboard signals. The device additionally includes adaptor means to provide the computer keyboard signals to the computer.

1 Claim, 5 Drawing Sheets

APPARATUS FOR CONNECTING AN AVIONICS CONTROL PANEL AND A TRAINING AND SIMULATION SYSTEM

FIELD OF THE INVENTION

The present invention relates to a device for connecting an aviation training and simulating apparatus and a control panel of avionics equipment. More particularly, the present invention relates to a connecting device used in an avionics system by which signals from a control panel can be directly transmitted to a training and simulating apparatus without the need to add an interface card or to change the hardware of the avionics system.

BACKGROUND OF THE INVENTION

An aviation training and simulation apparatus is generally used to train aviators to operate an airplane in a simulation environment. Conventionally, there are two types of aviation training and simulation apparatus. One of them is to digitally process profiles and functions of a real control panel and displays a virtual control panel on the screen of a computer. An aviator being trained operates the control panel on the screen by means of a mouse or a touch-controlled screen to simulate the operations of an airplane. In such a case, the aviator only becomes familiar with operation procedures of the virtual control panel, but is far away from the real aviation environment.

Therefore, to let the aviator feel as if he were there, the other conventional training and simulation apparatus is designed to provide the aviator with a realistic environment by providing a control panel identical with the one in the pilot cabin of an airplane so that the aviator can touch and operate the real panel. As shown in FIG. 1, a control panel 2 typically comprises a display 21 and a keyboard device 22 to input signals. An output of the control panel is input to a training and simulation apparatus including a personal computer. The monitor screen of the personal computer is synchronous with the display of the training and simulation apparatus to monitor the control operations of the aviator.

The above-described training and simulation apparatus must include an interface card 6 to connect control panel 2 to data/control bus of the computer. Since output signals of the control panel are input to computer through the bus, the interface card must be designed according to the control signals of the bus, resulting in complex design of interface card 6 and an increase in the computer hardware cost.

SUMMARY OF THE INVENTION

The object of the present invention is to provide a new connecting device that reduces the inconvenience and complexity of an interface card. The design of the connecting device functions as an adaptor that can directly transfer an output from a simulated control panel to a personal computer and eliminates the trouble with interface card design to simplify software and hardware architecture of the training and simulation apparatus.

BRIEF DESCRIPTION OF THE DRAWINGS

To explain the objects and advantages of the present invention, the following drawings and preferred embodiments are used to describe the explanations.

DETAILED DESCRIPTION OF THE PREFERRED EMBODIMENTS

Figure 1:
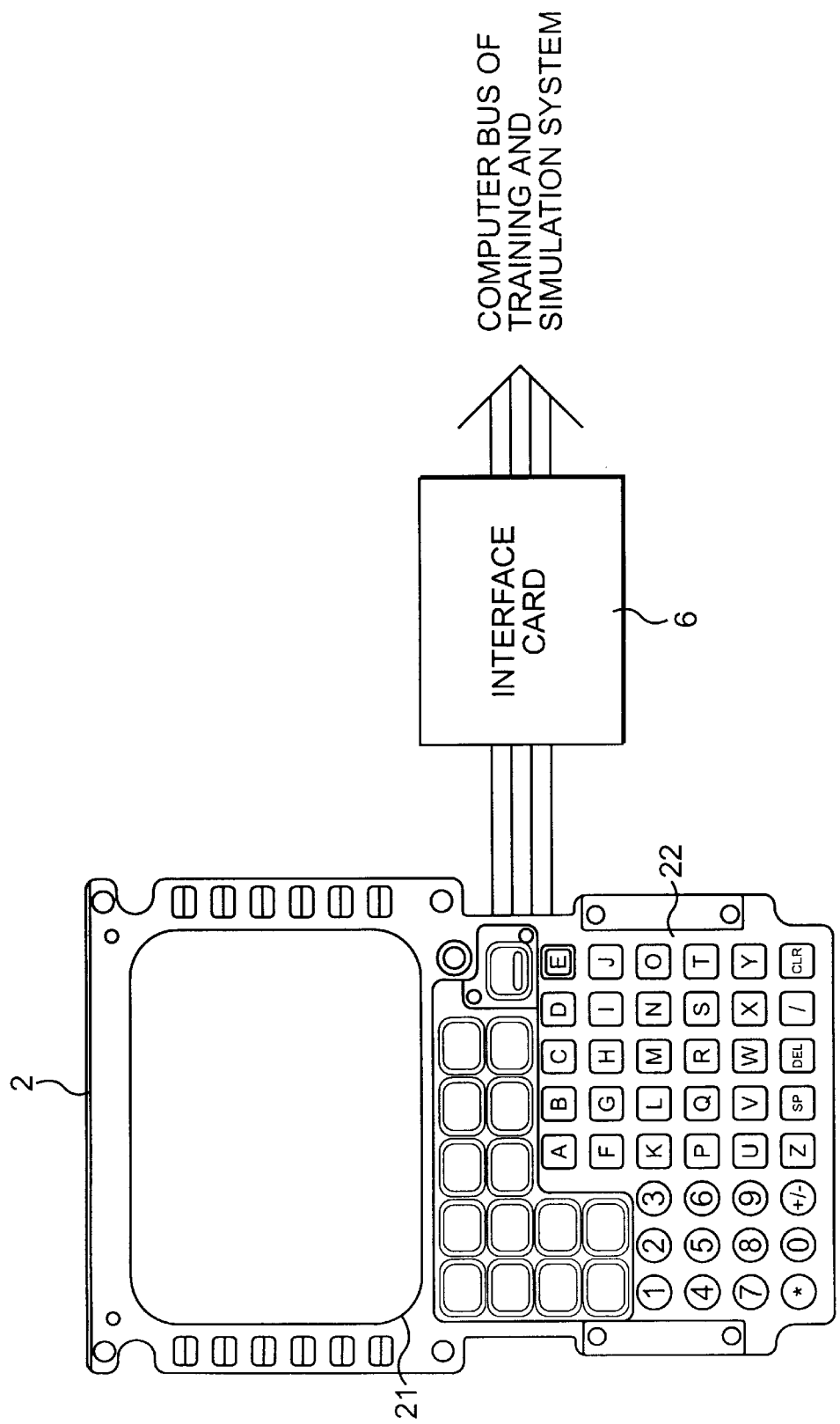
FIG. 1 shows a basic schematic block diagram of a conventional training and simulation apparatus.
Figure 2:
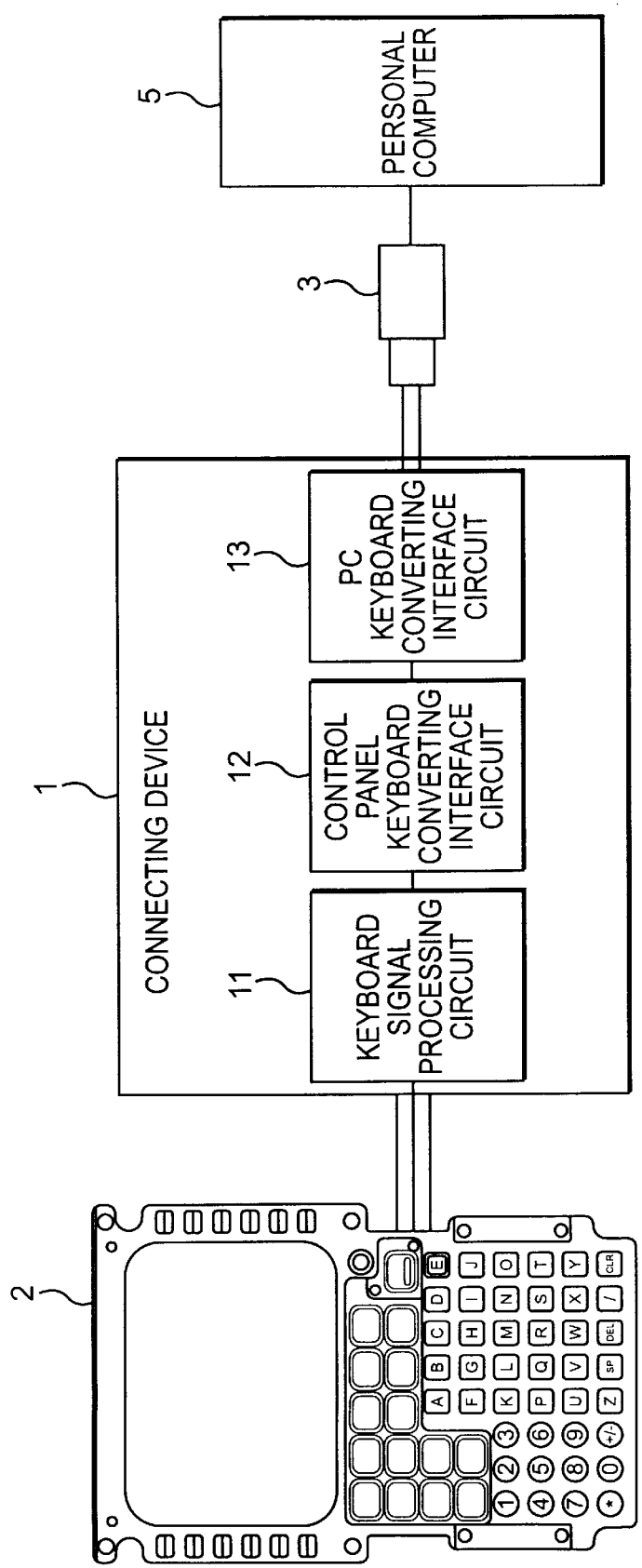
FIG. 2 shows a schematic block diagram of a training and simulation apparatus in accordance with the present invention.
Figure 5:
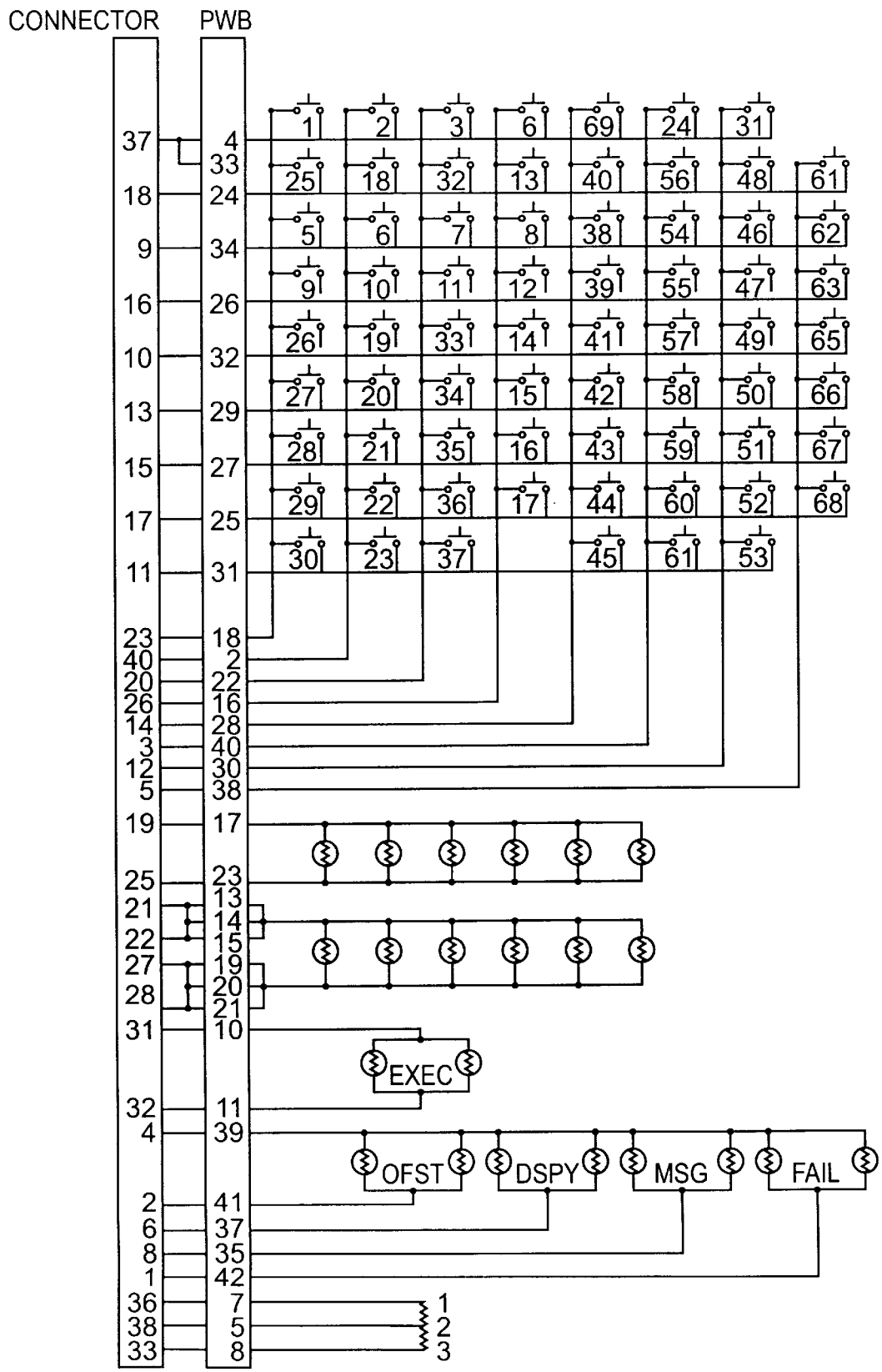
FIG. 5 shows a matrix-array switch of a keyboard signal processing circuit of the present invention.

Referring to FIG. 2, it shows a basic schematic of the device to connect an avionics control panel 2 and a training and simulation apparatus 5 in accordance with the present invention. In accordance with the present invention, a connecting device 1 primarily connects through a keyboard signal processing circuit 11, a control panel keyboard converting interface circuit 12, a PC keyboard converting interface circuit 13 and a PC keyboard adaptor 3 the keyboard input side of the personal computer (not shown) of the training and simulation apparatus 5. Keyboard signal processing circuit 11 uses a matrix-array switch (shown in FIG. 5) to decode keyboard signals of control panel 2 and the converting interface circuit 12 interprets and converts the keyboard signals from the control panel 2 into computer-readable signals. Then, the PC keyboard converting interface cirucit 13 provides the converted signals to the personal computer of the training and simulation system 5 through the keyboard adaptor 3. Therefore, the principle of the present invention is to fetch control panel signals and input the signals into the personal computer through transferring the signals into computer keyboard signals. Thus, there only needs a PC keyboard adaptor to couple with a personal computer without having to additionally design an interface card or changing the hardware of the computer.

Figure 3:
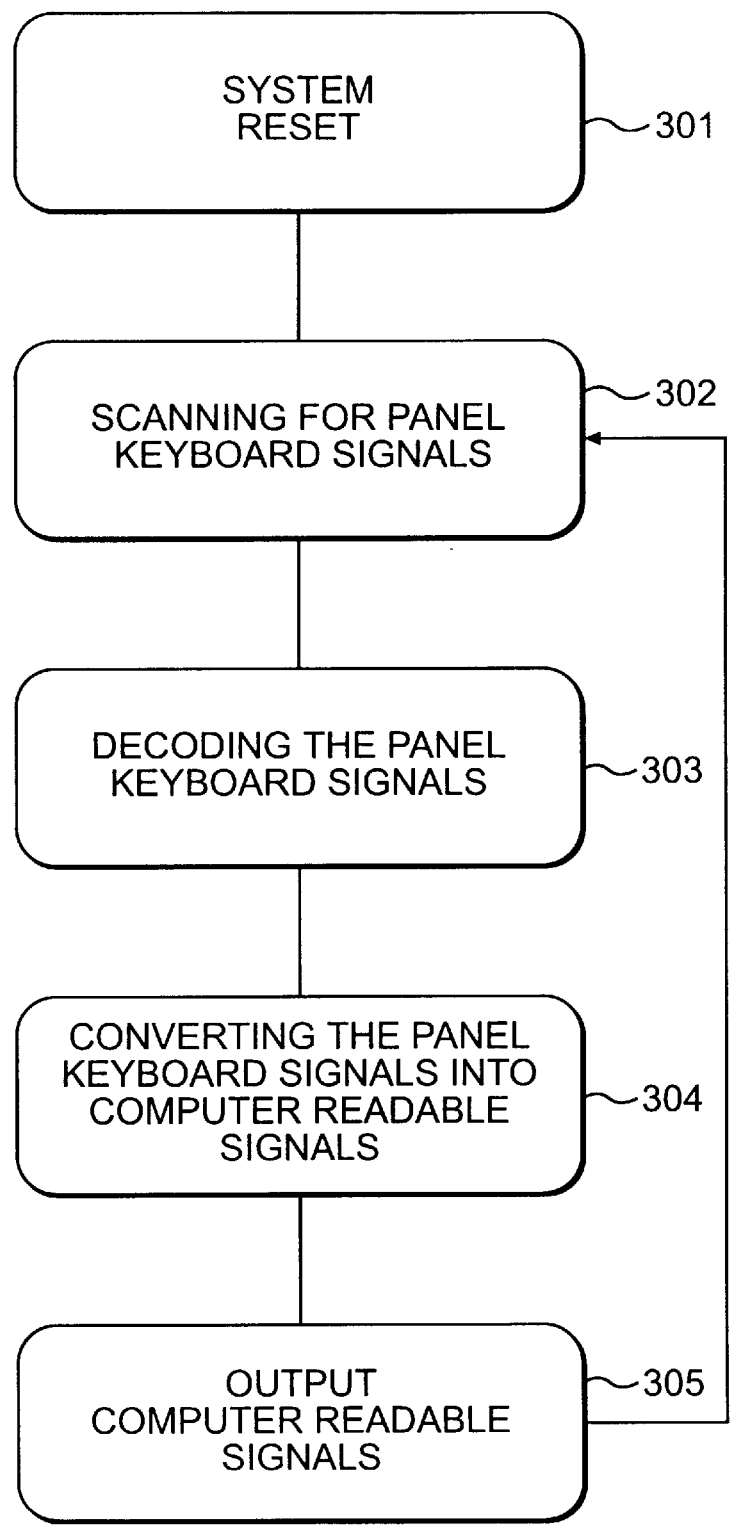
FIG. 3 shows a signal controlling flow chart of a connecting device in accordance with the present invention.

FIG. 3 is a flow chart that shows how connecting device 1 reads and processes the output signals of the avionics control panel 2. At the beginning of every training, the system is reset (step 301), and then keyboard signal processing circuit 11 scans (step 302) and identifies (i.e., decodes, step 303) the keyboard signals of the control panel 2. The converting interface circuit 12 and the computer keyboard converting interface circuit 13 then converts the decoded keyboard signals into PC keyboard signals (step 304), then through PC keyboard adaptor 3 input the PC keyboard signals (step 305) into the personal computer of the training and simulation system 5.

Figure 4:
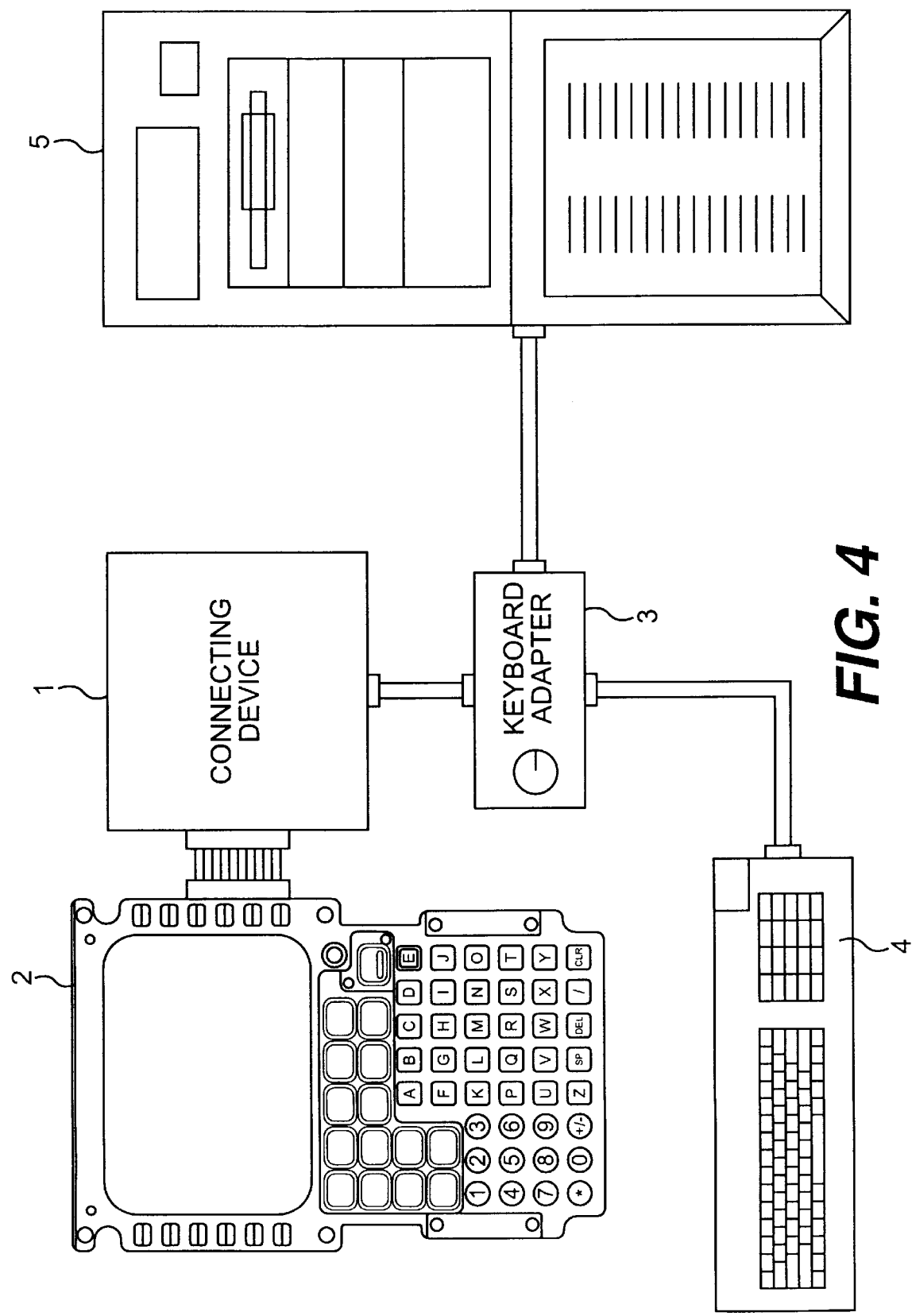
FIG. 4 shows an embodiment of a connecting device which is used in a training and simulation system without a realistic control panel for training in accordance with the present invention.

According to the principle of the present invention, because the avionics control panel 2 and the personal computer 5 communicate by keyboard signals, the apparatus of the present invention may easily be practiced in a conventional training and simulation system without realistic avionics control panel for training, shown as the reference number 2' in FIG. 4 which is like the first type of aviation training and simulation apparatus mentioned in the Background of The Invention. As shown in FIG. 4, to practice this type of training in a conventional aviation training and simulation system, it only needs to add a keyboard 4 adapted to the keyboard adaptor 3 of the present invention to input the signals from connecting device into a personal computer in a training and simulation apparatus.

In view of the above, since the connecting device of the present invention converts signals from a control panel to a keyboard terminal of a computer, the aviation training and simulation apparatus simplifies both software and hardware designs, decreasing training costs, improving visual and touch effect, and a flexible training environment, meeting the patentability requirements.

The above embodiment describes the principle and advantages of the present invention, and not to limit of the scope of the present invention, which is listed as follows.

What is claimed is:

1. A device for connecting a control panel of an avionics equipment to a training and simulation apparatus, the control panel including a monitor and a keyboard, the keyboard having an output, and the training and simulation apparatus including a personal computer, comprising:

a signal processing circuit connected to the output of the keyboard of the control panel for detecting and analyzing control panel keyboard signals;

a control panel keyboard converting interface circuit for converting said control panel keyboard signals to keyboard signals of the personal computer; and a personal computer keyboard converting interface circuit for providing to the personal computer of the training and simulation apparatus said signals converted by said control panel keyboard converting interface circuit.

* * * * *